April 8, 1924.
A. MILLER
SAW SET
Filed Dec. 26, 1922
1,489,539
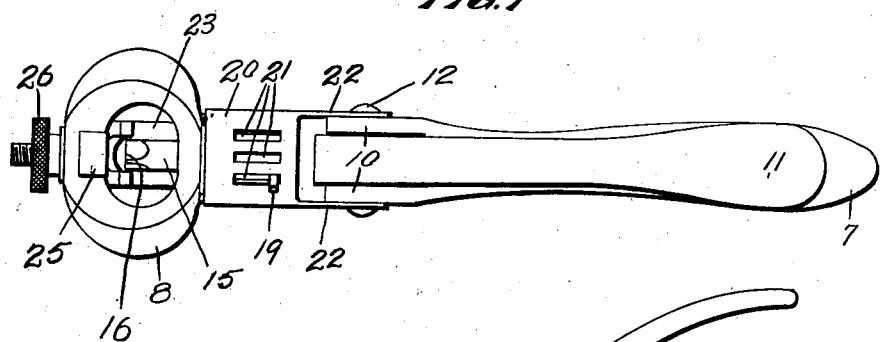
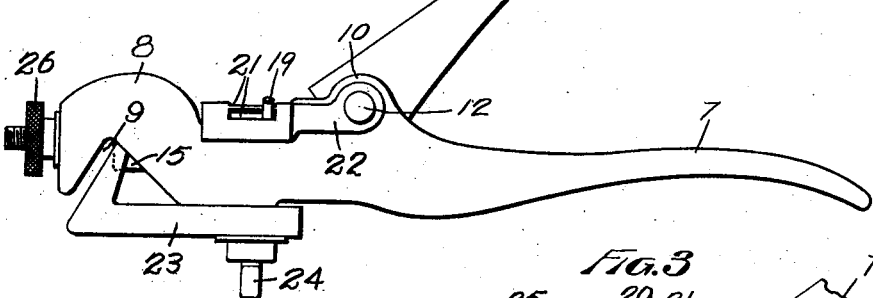
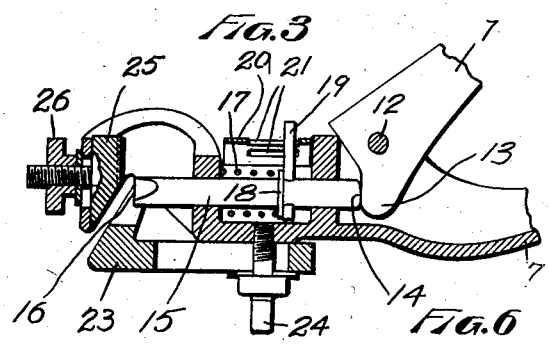
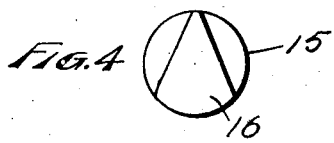
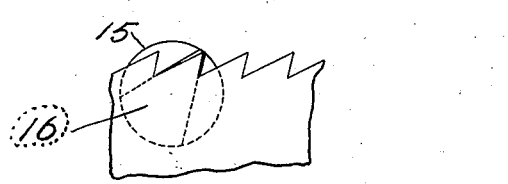
INVENTOR
ADOLPH MILLER
BY Edward E. Longan
ATTY.

Patented Apr. 8, 1924.

1,489,539

UNITED STATES PATENT OFFICE.

ADOLPH MILLER, OF KIRKWOOD, MISSOURI.

SAW SET.

Application filed December 26, 1922. Serial No. 608,889.

*To all whom it may concern:*

Be it known that I, ADOLPH MILLER, a citizen of the United States, and resident of the city of Kirkwood, county of St. Louis, and State of Missouri, have invented certain new and useful Improvements in Saw Sets, of which the following is a specification, containing a full, clear, and exact description, reference being had to the accompanying drawings, forming a part thereof.

My invention relates to improvements in saw sets and has for its primary object a saw set whereby it is possible to so adjust the plunger that it will only contact with the tooth being set.

A further object is to construct a saw set which has a plunger capable of being turned on its longitudinal axis so that during the process of setting a saw, it will come in contact with one tooth only, consequently it is possible to get the same amount of set on both sides of the saw. Heretofore, unless a person was expert in setting saws there was a great danger of destroying the set on one side of the saw while the other side was being set, so that the teeth would project farther on one face than on the other, by my device, an inexperienced person is enabled to set a saw as accurately as an expert.

In the drawings:

Fig. 1 is a top plan view of a saw set embodying my improvement;

Fig. 2 is a side elevation of the same;

Fig. 3 is a longitudinal vertical section of the forward part of the saw set, the handles being broken away;

Fig. 4 is an enlarged front end elevation of the plunger;

Fig. 5 is a diagrammatic view showing the position of the plunger of the present type of saw set relative to the saw teeth and Fig. 6 is a diagrammatic view showing my adjustable plunger in position.

In the construction of my device I employ a handle 7 which is preferably U shaped in cross section and which is shaped so as to form a convenient grip for the fingers, this handle is provided on its forward end with a yoke 8, the yoke 8 is substantially elliptical and has its end walls provided with a V shaped recess 9, the handle 7 is provided with spaced apart upwardly projecting ears 10 between which is secured a handle 11, this handle is pivotally mounted on a rivet or stud 12, the handle 11 is provided with a projection 13 which contacts with the end 14 of the plunger 15, the forward end 16 of the plunger is cut away so as to leave the end 16 substantially wedge shaped, the remainder of the plunger is cylindrical; surrounding the plunger is a coil spring 17 which bears against a washer 18, this washer is held in position by means of a pin 19, the pin 19 is designed to extend upwardly and is for the purpose, not only of holding the spring 17 in operable position, but also to allow the plunger 15 to be rotated on its longitudinal axis, and in order to hold the plunger in fixed position I employ a shield 20 which is provided with longitudinally extending slots 21 through which the pin 19 projects, the shield 20 is provided with arms 22 by means of which it is pivotally secured to the handle 7 by means of the rivet 12, the handle 7 is also provided with a gauge 23 which is for the purpose of regulating the amount of set given to the teeth, this gauge is adjustable and is held in position by means of a thumbscrew 24; mounted in the yoke 8 is an anvil 25, which anvil is vertically adjustable by means of the thumb-nut 26; the purpose of adjusting this anvil vertically is to take care of various sizes of saw teeth, by lowering the anvil, a coarse tooth is taken care of, while by raising it, the desired adjustment is obtained for the finer teeth.

The operation of my device is as follows:

After the gauge 23 and anvil 26 have been properly adjusted, the pin 19 is turned so as to rotate the plunger 15 on its longitudinal axis either to the right or left depending in which direction the teeth are being set, of course, it is necessary before this rotation can be accomplished, to swing the shield upward so as to clear the pin, when the plunger has been set the shield 20 is moved downward so that the pin projects through one of the slots, the saw set is now worked in the ordinary manner, that is, by pressing on the handle 11, but due to the rotation of the plunger 15, it has assumed the position shown in Fig. 6 so that it contacts with one tooth only and with no part of any other tooth; after the one side of the saw has been set, the shield 20 is again lifted upward and the pin turned to the opposite side, when the former operation is repeated.

In the event that it is desired to set saws having V teeth, such as are commonly found in buck-saws, the pin 19 is placed in a vertical position.

The reason that it is essential to rotate the plunger 15 is illustrated in Fig. 5, since it is necessary to apply pressure to the point of the tooth and where the plunger is not adjustable, the plunger will press against the heel of the tooth immediately in front of that being set, this has a tendency either to straighten out any setting previously imparted to that tooth and also to put a kink in the saw which makes it virtually impossible to saw on a straight line and also causes the saw to hang or drag in the cut, necessitating the expenditure of unnecessary physical labor. Of course with the V shaped tooth the point being equi-distant from the base on both sides, it is not necessary that the plunger be rotated in either direction.

Having fully described my invention, what I claim is:—

1. A saw set comprising a handle, a yoke formed integral therewith, a plunger slidably mounted in said handle and projecting into said yoke, a second handle pivotally secured to the first mentioned handle, said second mentioned handle adapted to impart longitudinal movement to said plunger, means carried by said plunger for adjusting the same by rotating it on its longitudinal axis, and pivotal means carried by one of said handles for holding said plunger in adjusted position.

2. A saw set comprising a handle, a yoke formed integral therewith, a plunger slidably mounted in said handle and projecting into said yoke, a second handle pivotally secured to the first mentioned handle, said second mentioned handle adapted to impart longitudinal movement to said plunger, a pin carried by said plunger for rotating the same on its longitudinal axis, and a slotted shield pivotally carried by the first mentioned handle and adapted to engage said pin for holding the plunger in adjusted position.

3. In a saw set, a pair of handles pivotally secured together, a yoke formed integral with one of said handles, a spring controlled plunger mounted in said handle and projecting into the yoke, means carried by the other handle for imparting longitudinal movement to said plunger, a pin carried by said plunger for adjusting the same on its longitudinal axis, and pivoted means adapted to receive said pin for holding the plunger in adjusted position.

In testimony whereof, I have signed my name to this specification.

ADOLPH MILLER.